United States Patent [19]

Harwood

[11] Patent Number: 5,448,831
[45] Date of Patent: Sep. 12, 1995

[54] METHOD OF MANUFACTURING A STAMP FORMED MUFFLER WITH HERMETICALLY SEALED LAMINATED OUTER SHELL

[75] Inventor: Jon W. Harwood, Toledo, Ohio

[73] Assignee: AP Parts Manufacturing Company, Toledo, Ohio

[21] Appl. No.: 148,903

[22] Filed: Nov. 8, 1993

[51] Int. Cl.6 ............................................. B23P 15/00
[52] U.S. Cl. ................................... 29/890.08; 29/463
[58] Field of Search ..................... 29/890.08, 463, 448, 29/455.1; 181/282

[56] References Cited

U.S. PATENT DOCUMENTS

| | | | |
|---|---|---|---|
| 705,357 | 7/1902 | Keating | 181/264 |
| 1,110,040 | 9/1914 | Chatain | 181/238 |
| 2,484,826 | 10/1949 | Harley | 181/49 |
| 2,484,827 | 10/1949 | Harley | 181/35 |
| 2,658,580 | 11/1953 | Trembley | 181/49 |
| 2,860,722 | 11/1958 | Gerstung | 181/68 |
| 2,902,109 | 9/1959 | Burgess et al. | 181/53 |
| 2,943,695 | 7/1960 | Geffords | 181/50 |
| 3,125,182 | 3/1964 | Carley | 181/53 |
| 3,140,755 | 7/1964 | Tranel | 181/61 |
| 3,158,222 | 11/1964 | Richmond | 181/59 |
| 3,176,791 | 4/1965 | Betts et al. | 181/52 |
| 3,198,284 | 8/1965 | Powers | 181/54 |
| 3,220,508 | 11/1965 | Rordquest et al. | 181/61 |
| 3,337,939 | 8/1967 | Parkinson | 29/890.08 |
| 3,412,825 | 11/1968 | Hall | 181/61 |
| 3,638,756 | 2/1972 | Thiele | 181/282 |
| 3,650,354 | 3/1972 | Gordon | 181/61 |
| 3,709,320 | 1/1973 | Höllerl et al. | 181/61 |
| 3,827,529 | 8/1974 | Frietzsche et al. | 181/238 |
| 3,852,041 | 12/1974 | Moore et al. | 181/288 F |
| 4,064,962 | 12/1977 | Hunt | 181/272 |
| 4,108,274 | 8/1978 | Snyder | 181/229 |
| 4,109,751 | 8/1978 | Kabele | 181/247 |
| 4,132,286 | 1/1979 | Hasui et al. | 181/265 |
| 4,165,798 | 8/1979 | Martinez | 181/265 |
| 4,396,090 | 8/1983 | Wolfhugel | 181/282 |
| 4,415,059 | 11/1983 | Hayaski | 181/250 |
| 4,418,790 | 12/1983 | Agnew | 181/268 |
| 4,422,519 | 12/1983 | Nomura et al. | 181/219 |
| 4,456,091 | 6/1984 | Blanchot | 181/282 |
| 4,523,660 | 6/1985 | Gaddi | 181/228 |

(List continued on next page.)

FOREIGN PATENT DOCUMENTS

| | | |
|---|---|---|
| 59-43456 | 3/1984 | Japan . |
| 59-155528 | 8/1984 | Japan . |
| 60-111011 | 6/1985 | Japan . |
| 61-14565 | 2/1986 | Japan . |
| 61-108821 | 6/1986 | Japan . |
| 61-155625 | 8/1986 | Japan . |
| 632013 | 1/1950 | United Kingdom . |
| 1012463 | 12/1965 | United Kingdom . |
| 2120318 | 11/1983 | United Kingdom . |

OTHER PUBLICATIONS

NACA Report 1192—Theoretical and Experimental Investigation of Mufflers with Comments on Engine—Exhaust Muffler design by Don D. Davis, Jr. et al, 1953.

Primary Examiner—Irene Cuda
Attorney, Agent, or Firm—Anthony J. Casella; Gerald E. Hespos

[57] ABSTRACT

A method of manufacturing a muffler including a pair of stamp formed laminated external shells, each of which includes inner and outer layers. The inner and outer layers are stamped simultaneously to nest with one another. However, the respective layers of each laminated shell will spring back slightly differently from one another in view of different metallurgical characteristics inherent in each sheet. The laminated external shells are then disposed around internal components of the muffler, and peripheral regions are securely clamped together. This clamping, in view of the differential spring-back creates a narrow air chamber between the layers of each laminated external shell. Peripheral regions are then laser welded together to hermetically seal the narrow air chamber between the layers of each external shell. The hermetically sealed air chamber effectively dampens vibrations of the external shells and contributes to both heat and noise insulation from interior regions of the muffler.

8 Claims, 3 Drawing Sheets

U.S. PATENT DOCUMENTS

| | | | |
|---|---|---|---|
| 4,598,790 | 7/1986 | Uesugi et al. | 181/252 |
| 4,690,245 | 9/1987 | Gregsrich et al. | 181/272 |
| 4,700,806 | 10/1987 | Harwood | 181/282 |
| 4,736,817 | 4/1988 | Harwood | 181/282 |
| 4,759,423 | 7/1988 | Harwood et al. | 181/282 |
| 4,760,894 | 8/1988 | Harwood et al. | 181/282 |
| 4,765,437 | 8/1988 | Harwood et al. | 181/282 |
| 4,809,812 | 3/1989 | Flugger | 181/268 |
| 4,821,840 | 4/1989 | Harwood et al. | 181/282 |
| 4,836,330 | 6/1989 | Harwood et al. | 181/282 |
| 4,847,965 | 7/1989 | Harwood et al. | 29/157 R |
| 4,860,853 | 8/1989 | Moring, III | 181/282 |
| 4,894,987 | 1/1990 | Harwood et al. | 181/282 |
| 4,901,815 | 2/1990 | Harwood et al. | 181/282 |
| 4,901,816 | 2/1990 | Garey | 181/296 |
| 4,905,791 | 3/1990 | Garey | 181/282 |
| 4,909,348 | 3/1990 | Harwood et al. | 181/282 |
| 4,928,372 | 5/1990 | Harwood et al. | 29/890.08 |
| 4,941,545 | 7/1990 | Wilcox et al. | 181/282 |
| 5,004,069 | 4/1991 | Van Blaircum et al. | 181/282 |
| 5,012,891 | 5/1991 | Macaluso | 181/282 |
| 5,036,585 | 8/1991 | Schweinfurth | 29/890.08 |
| 5,042,125 | 8/1991 | Harwood et al. | 29/33 K |
| 5,164,551 | 11/1992 | Harwood et al. | 181/238 |
| 5,173,577 | 12/1992 | Clegg et al. | 181/282 |
| 5,252,788 | 10/1993 | Emrick et al. | 181/282 |

METHOD OF MANUFACTURING A STAMP FORMED MUFFLER WITH HERMETICALLY SEALED LAMINATED OUTER SHELL

BACKGROUND OF THE INVENTION

1. Field of the Invention

The subject invention relates to an exhaust muffler having a stamp formed outer shell defined by laminated sheets which have a minute air gap therebetween and which are hermetically sealed around their peripheries.

2. Description of the Prior Art

Most prior art exhaust mufflers include an array of pipes supported in parallel relationship by a plurality of transversely extending baffles. The baffles typically are of identical oval or circular cross-sectional shape. A sheet of metal is then wrapped around the baffles to define an open ended shell with a circular or oval cross-sectional shape conforming to the shape of the baffles. Opposed longitudinal edges of the shell are mechanically folded in overlapped relationship to secure the shell around the baffles.

An outer shell formed from a single thickness of metal may vibrate in response to the pulsating flow of exhaust gas through the muffler. These shell vibrations are known to create a shell ring independent of the noise associated with the flowing exhaust gas. Hence, a second sheet of metal may be wrapped around the shell, and opposed longitudinal edges may be engaged with one another to define an outer wrapper. The outer wrapper dampens the vibrations of the shell and attenuates shell ring.

Opposed end caps or headers which conform to the shape of the baffles are mechanically locked to opposed ends of the shell and wrapper. Each header includes at least one aperture which enables exhaust gas to flow into and out of the muffler.

Many prior art mufflers include an array of embossments on either the shell or the wrapper. The shell and the wrapper will contact one another only at the embossed regions. Remaining regions will define spaces that are intended to enhance noise insulation.

The prior art also includes exhaust mufflers that are defined, at least in part, by stamp formed sheets of metal. For example, some prior art mufflers include conventional tubes and baffles surrounded by opposed stamp formed outer shells. The shells are formed to define peripheral flanges that can be registered with one another to substantially enclose the tubes, and baffles. The registered flanges on the prior art muffler have been attached by mechanical crimping or by spot welding. The spot welds typically are placed close to one another to effectively define a seam around the periphery of the muffler. An example of a muffler of this type is shown in published U.K. Patent Application No. 2,120,318 dated Nov. 30, 1983.

Other prior art mufflers include only a pair of plates that are stamped to define an array of channels and chambers. The plates are secured in face-to-face relationship by welding or crimping, and the stamp formed channels and chambers define a flow path for exhaust gas that will attenuate noise. A muffler of this general type is shown in U.S. Pat. No. 3,638,756 which issued to Thiele on Feb. 1, 1972.

The prior art also includes mufflers with stamp formed plates to define tubes and stamp formed outer shells to define chambers. A commercially successful muffler of this type is shown in U.S. Pat. No. Re 33,370 which was reissued on Oct. 9, 1990.

Stamp formed outer shells on exhaust mufflers also can generate vibration related noise. Shell vibrations in stamp formed mufflers typically have been attenuated by stamping an array of reinforcing ribs in the external shell. One particularly effective pattern of reinforcing ribs is shown in U.S. Pat. No. 4,924,968 which issued on May 15, 1990. Although ribs can be effective in attenuating the vibration of shells, the ribs also add significantly to the total amount of metal required for the outer shell. Additionally, ribs can complicate the stamping process and can generate excessive local stretching of metal. Ribs also can be difficult to design. A rib pattern that is effective for one muffler may not necessarily be effective for a different muffler, and engineers must experiment with different rib dimensions and spacings for each family of similar mufflers.

Prior art mufflers also have been provided with stamp formed heat shields, as shown, for example, in U.S. Pat. No. 4,759,423 is which issued on Jul. 26, 1988. One heat shield shown in U.S. Pat. No. 4,759,423 is formed on the same stamping apparatus as the corresponding external shell and then is nested over the muffler. Another heat shield shown in U.S. Pat. No. 4,759,423 is formed on a different stamping apparatus and is formed to have selected areas spaced significantly from the associated external shell. Both embodiments show the heat shield being formed from a different material than the external shells. Spot welding through more than four thicknesses of metal is very difficult. Hence, heat shields of the type shown in U.S. Pat. No. 4,759,423 would be attached after the muffler was completed.

Exhaust mufflers are susceptible to corrosive damage. Corrosion can be generated from either the inside of the muffler or the outside. For example, exhaust gases contain both corrosive chemicals and moisture. The mixture of vapors and corrosive chemicals often condenses at a low point of a muffler. This corrosive sludge may act on and eat through the metallic shell of the muffler. The prior art includes several approaches for reducing internally generated corrosion. For example, it is well known to place a small drain hole at the low point of a muffler. The prior art also includes siphon tubes having one end in an exhaust pipe and the opposed end at a location that is likely to accumulate moisture. The flowing exhaust gas effectively sucks moisture from the chamber and prevents a long term build-up. The prior art also attempts to avoid corrosion by using costly corrosion resistant metals when necessary.

Externally generated corrosion is common in northern climates where salt or other de-icing chemicals are used on roads. These chemicals can accumulate on horizontal surface and can accelerate corrosion. Once again, outer shells of mufflers can be formed from or coated with material that will resist corrosion from such de-icing chemicals.

Corrosion has been a particular problem in prior art mufflers having two layers of metallic material in close proximity to one another, such as the above described conventional mufflers with wrapped outer shells. Internally or externally generated corrosive chemicals are known to wick into microscopically small gaps between the mechanically folded seams on wrapped outer shells or between spot welded shields and external shells of mufflers. Corrosive liquids in these locations do not readily drain. Additionally, the corrosive liquid may function as an electrolyte with contributes to galvanic action between closely spaced layers of metal. Muffler manufacturers prefer the ability to use disparate metals for different parts of a muffler depending upon system needs. However, the galvanic reactions are greater when a corrosive chemical is disposed between two different metals. As a result, engineers often are forced to use two identical metals for a shell and a wrapper, even though two different metals might be more appropriate in other respects. Thus, for example, it may be required to use a more costly stainless steel for an outer wrapper even though a less costly low carbon steel would be functionally acceptable.

Seam welding has been used on many prior art stamp formed mufflers as an alternative to mechanical crimping of the peripheral flanges. Seam welding, however, is actually a series of closely spaced spot welds. Invariably, a plurality of microscopic gaps exist in a seam weld at spaced apart locations around the peripheral flanges. These small gaps do not affect acoustical performance. However, the gaps may permit wicking of corrosive liquids. Seam welding also is not well suited to connecting disparate metals. Hence, mufflers with welded seams typically use the same metal throughout.

In view of the above, it is an object of the subject invention to provide an exhaust muffler with an enhanced ability to eliminate shell ring.

It is another object of the subject invention to provide an exhaust muffler with enhanced heat insulating capabilities.

A further object of the subject invention is to provide an exhaust muffler which eliminates or reduces the need for reinforcing ribs in an outer shell.

An additional object of the subject invention is to provide an exhaust muffler with enhanced resistance to corrosion.

Yet a further object of the subject invention is to provide an improved method for manufacturing an exhaust muffler.

SUMMARY OF THE INVENTION

The subject invention is directed to a muffler having at least one inlet, at least one outlet and at least one tube and chamber therebetween. The tube and chamber may be formed from conventional separate tubes and baffles. Alternatively, the tube and chamber may be formed from stamped components.

The muffler of the subject invention further includes a pair of opposed formed external shells surrounding the tube and at least partly define the chamber of the muffler. The external shells have peripheral flanges registered with one another and secured as described further below. The shells and the internal components may be formed to define a plurality of internal chambers for exhaust gas expansion and noise attenuation. The external shells may be substantially free of reinforcing ribs to enable a significant reduction in the stretching of metal and the amount of metal required for the external shells.

Each external shell may be of laminated construction with inner and outer shell layers, which may be the same or different metals of the same or different thicknesses. The inner and outer shell layers may be stamped or otherwise formed simultaneously on the same forming apparatus by merely inserting two metal sheets into the apparatus in substantially face-to-face relationship.

Mufflers generally have outer shells formed from metal with a thickness between 0.030 and 0.050 inch. The required thickness for prior art mufflers is determined in view of the type of metal being used, the dimensions of the muffler and the flow rate of exhaust gases flowing through the muffler. The inner and outer layers of each external shell of the subject muffler have thicknesses substantially less than the total required thickness for the muffler shell. However, the combined thicknesses of the inner and outer layers of the laminated external shell may be approximately equal to the total required thickness for the external shell. Thus, the inner and outer layers of each external shell each may have a material thickness of approximately 0.015–0.025 inch.

The respective sheets will be formed into substantially identical shapes by the forming apparatus. Upon release of pressure by the forming apparatus, the respective sheets will spring-back slightly. However, different metallurgical characteristics of each respective sheet will cause a slightly different spring-back despite the fact that the sheets are formed simultaneously on the same stamping apparatus.

The laminated external shells are disposed in surrounding relationship to the internal components of the muffler such that the peripheral flanges of the external shells are substantially registered with one another. The peripheral flanges are clamped together in their registered disposition such that the inner and outer layers of each external shell are in secure face-to-face relationship with one another. This clamping of the peripheral flanges, when considered in view of the above described differential spring-back causes a minute air gap to be defined between the inner and outer layers of the respective laminated external shells. The air gap typically will define a thickness of approximately 10% of the total metal thickness of the laminated external shell. Thus, a laminated external shell defined by inner and outer layers with thicknesses of 0.018 inch will have a gap between the inner and outer layers of approximately 0.0036 inch. The precise dimensions of the gap will vary at different locations across the external shell in view of surface irregularities, variations in material thickness and variations in metallurgical characteristics causing non-uniform spring-back after the simultaneous stamping of the inner and outer layers.

The clamped peripheral flanges of the external shells are securely and continuously connected to one another by welding, such as laser welding or electron beam welding. Laser welding is capable of integrally connecting the plural thicknesses defined by the registered and clamped peripheral flanges of the laminated external shells, plus additional thicknesses due to any internal plates that may be provided for the muffler. Unlike prior art spot welding, the laser weld provides a continuous line of attachment that hermetically seals the air gap between the inner and outer layers of each laminated external shell. The hermetic seal achieves several significant advantages. First, the hermetically sealed air gap provides significantly enhanced noise and heat insulation and substantially reduces shell vibration and associated noise. This reduction of shell vibration typically avoids the need for reinforcing ribs, or at least significantly reduces the number of reinforcing ribs that may be required. As a result, a measurable saving in total metal required for external shells can be achieved, and the amount of metallic stretching generated during the shell formation is reduced. Furthermore, engineering time to design and test rib patterns is substantially eliminated. Additionally, the hermetic seal created by the laser weld prevents the wicking of moisture into the narrow space between the inner and outer layers of the laminated shell. Thus, corrosion generated in this narrow space is substantially reduced or eliminated. Still further, the absence of corrosive liquids between the laminated layers enables dissimilar metals to be used for the inner and outer layers without risk of increased galvanic action therebetween. Hence, the inner and outer layers of the laminated external shells can be different metals selected for the unique interior and exterior requirements of the muffler, without concern for corrosion.

DETAILED DESCRIPTION OF THE PREFERRED EMBODIMENT

A muffler in accordance with the subject invention comprises a pair of opposed laminated external shells which at least partly define chambers of the muffler. Each laminated external shell is formed from first and second sheets of metal. More particularly, as shown schematically in FIG. 1, each external shell is formed in a stamping apparatus 10 having opposed male and female dies 12 and 14 having complimentary engageable faces formed to define chambers as explained further herein. In alternate embodiments, hydroforming or stretch forming apparatus may be used. As depicted schematically in FIG. 1, the stamping apparatus 10 is configured to completely form each laminated external shell in a single shot. In actual practice, however, a progressive stamping apparatus may be employed, with the final configuration of the laminated external shell being progressively formed at each of several spaced apart stations in a stamping apparatus. Additionally, as depicted schematically in FIG. 1, the male and female dies 12 and 14 are each of unitary construction. However, the male and female dies each may include arrays of die sets and die subsets to enable variations in the shape of the laminated external shell. Thus, for example, a family of related mufflers can be made. All members of the family might have the same overall dimensions. However, minor changes, such as inlet or outlet locations and baffle dimensions can be changed from one member of the family to another.

Figure 1:
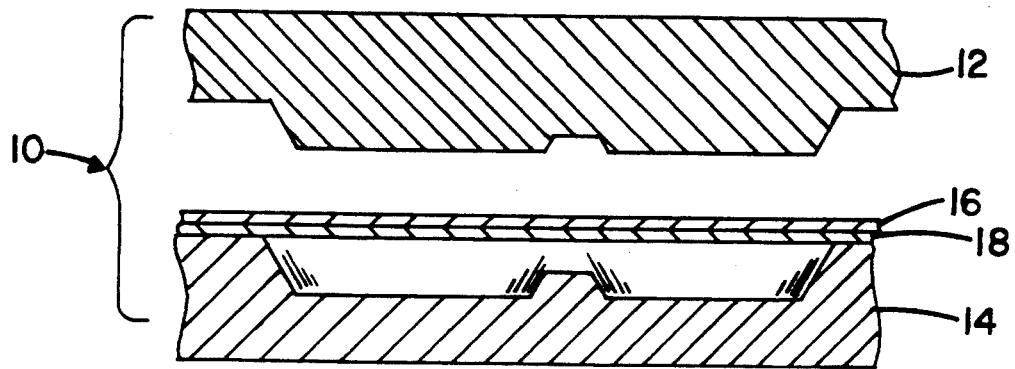
FIG. 1 is a schematic cross-sectional view of a stamping apparatus for forming a laminated external shell for a muffler.

As shown in FIG. 1, inner and outer sheets of metal 16 and 18 respectively are positioned in the stamping apparatus 10 for simultaneous stamped formation. As a result, the sheets of metal 16 and 18 will be formed simultaneously into complimentary configurations in nested relationship to one another to define an external shell.

Figure 2:
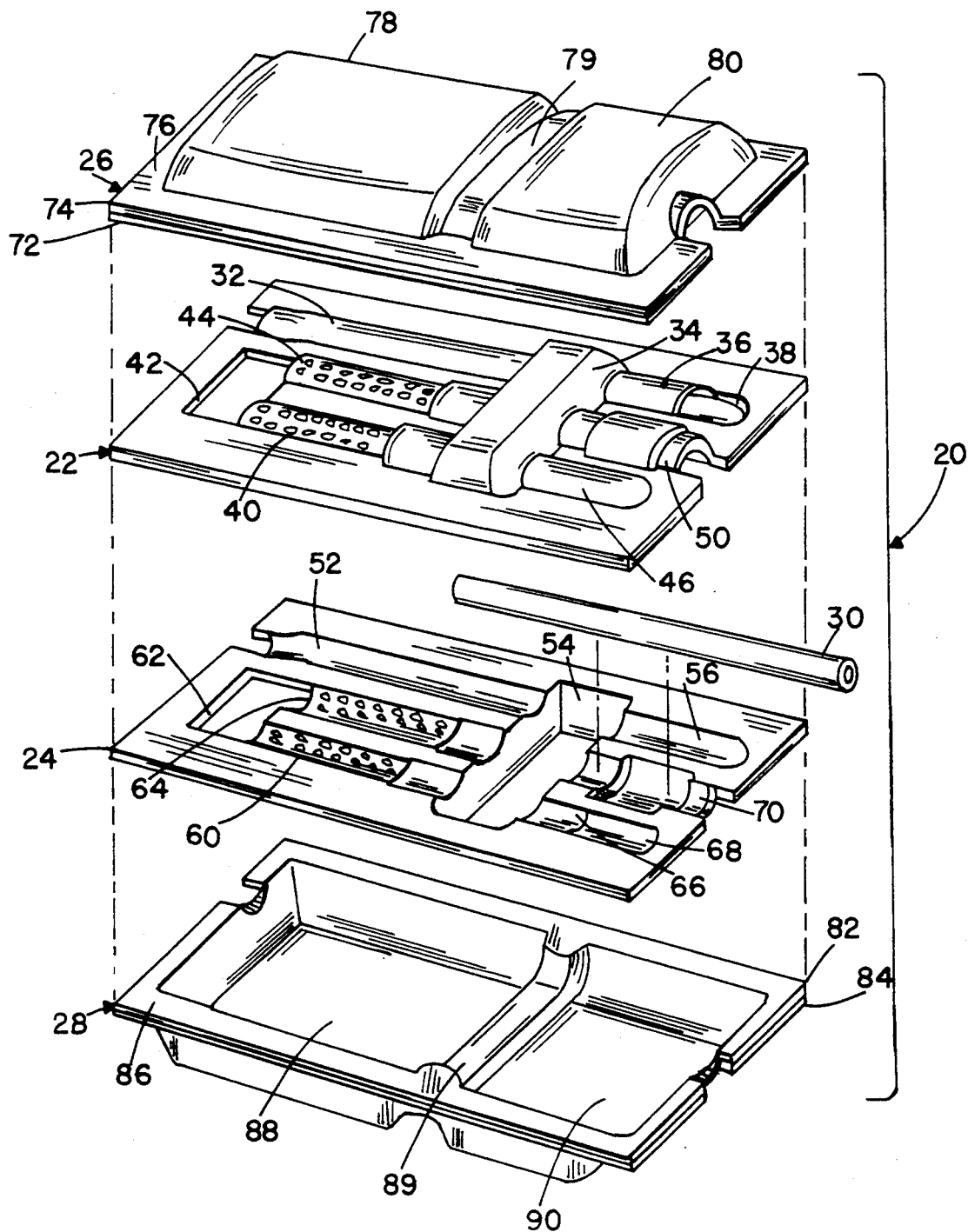
FIG. 2 is an exploded perspective view of the muffler of the subject invention.

A pair of external shells formed as described above are incorporated into a muffler 20 as shown in FIG. 2. More particularly, muffler 20 includes first and second stamp formed internal plates 22 and 24 respectively, first and second stamp formed laminated external shells 26 and 28 respectively and a conventional pipe 30.

The first internal plate 22 is of generally rectangular shape, and is formed to include an array of channels and chambers. More particularly, the first internal plate 22 includes an inlet channel 32 extending from one end of the first internal plate 22 to a chamber 34 between the opposed ends. A tuning channel 36 also communicates with the chamber 34 and is substantially aligned with the inlet channel 32. The tuning channel 36 terminates at a tuning aperture 38 stamped through the first internal plate 22.

A first flow channel 40 extends from the chamber 34 to an expansion aperture 42 which is stamped through the first internal plate 22 at a location generally adjacent the inlet end of the first internal plate 22. A plurality of perforations extend through the first flow channel 40 to enable a controlled expansion of exhaust gas in the known manner. A second flow channel 44 extends from the expansion aperture 42 back to the chamber 34. The second flow channel 44 also is provided with perforations. A second tuning channel 46 extends from the chamber 34 toward the outlet end of the first internal plate 22. The second tuning channel 46 does not include a tuning aperture. An outlet channel 50 extends from the chamber 34 to the outlet end of the first internal plate 22 at a location substantially aligned with the second flow channel 44. The outlet channel 50 and at least portions of the second flow channel 44 are dimensioned to receive the conventional pipe 30 as explained further herein.

The second internal plate 24 also is stamped and formed to include a plurality of channels and chambers. The channels and chambers in the second internal plate 24 are disposed and dimensioned to cooperate with the channels in the first internal plate 22 to define an array of flow tubes and chambers. More particularly, the second internal plate 24 includes an inlet channel 52 which extends from the inlet end of the first internal plate to a chamber 54. The inlet channel 52 and the chamber 54 are dimensioned and disposed to register with the inlet channel 32 and the chamber 34 of the first internal plate 22. The second internal plate 24 further includes a first tuning channel 56 extending from the chamber 54 and disposed to register with the first tuning channel 36 of the first internal plate 22. The first tuning channel 56, however, does not include a tuning aperture comparable to the tuning aperture 38 in the first internal plate 22.

A first perforated flow channel 60 extends from the chamber 54 to an expansion aperture 62 in proximity to the inlet end. The first flow channel 60 of the second internal plate 24 is disposed to register with the first flow channel 40 in the first internal plate 22. A second perforated flow channel 64 extends from the expansion aperture 62 back to the chamber 54. Once again, the second flow channel 64 of the second internal plate 24 is disposed to register with the second flow channel 44 in the first internal plate 22. As depicted in FIG. 2, the flow channels 40, 44, 60 and 64 all include arrays of circular perforations. Other means can be provided for enabling expansion of exhaust gas. For example, slots or louvers may be used in place of the circular perforations depicted in FIG. 2. Additionally, at least one of the channels may be free of apertures to limit and control the expansion of exhaust gas. A second tuning channel 66 extends from the chamber 54 toward the outlet end of the second internal plate 24. The second tuning channel 66 terminates at a tuning aperture 68.

An outlet channel 70 extends from the chamber 54 to the outlet end of the second internal plate 24. The outlet channel 70 is substantially aligned with the second flow channel 64. Additionally, the outlet channel 70 and at least portions of the second flow channel 64 are dimensioned to receive the conventional pipe 30.

The first laminated external shell 26 comprises an inner layer 72 and an outer layer 74 which are stamped simultaneously to be in nested relationship with one another as shown in FIG. 2. The first laminated external shell 26 includes a generally planar peripheral flange 76 dimensioned and configured to register with regions of the first internal plate 22 inwardly from the periphery thereof. The first laminated external shell 26 is further formed to define an expansion chamber 78 and a low frequency resonating chamber 80 which are separated from one another by an attachment region 79. It will be noted that the chambers 78 and 80 are free of reinforcing ribs as had been included on most prior art stamp formed mufflers. Rather, the walls defining the chambers 78 and 80 are substantially planar and continuous.

The second laminated external shell 28 also is formed from nested inner and outer layers 82 and 84 respectively. A second laminated external shell 28 is formed to include a peripheral flange 86 which is dimensioned to register with peripheral regions of the second internal plate 24 and to generally register with the peripheral flange 76 of the first laminated external shell 26. The second laminated external shell 28 is further formed to defined an expansion chamber 88 and a low frequency resonating chamber 90 which are separated from one another by an attachment region 89. The chambers 88 and 90 formed in the second external plate 28 also are substantially free of reinforcing ribs.

Figure 3:
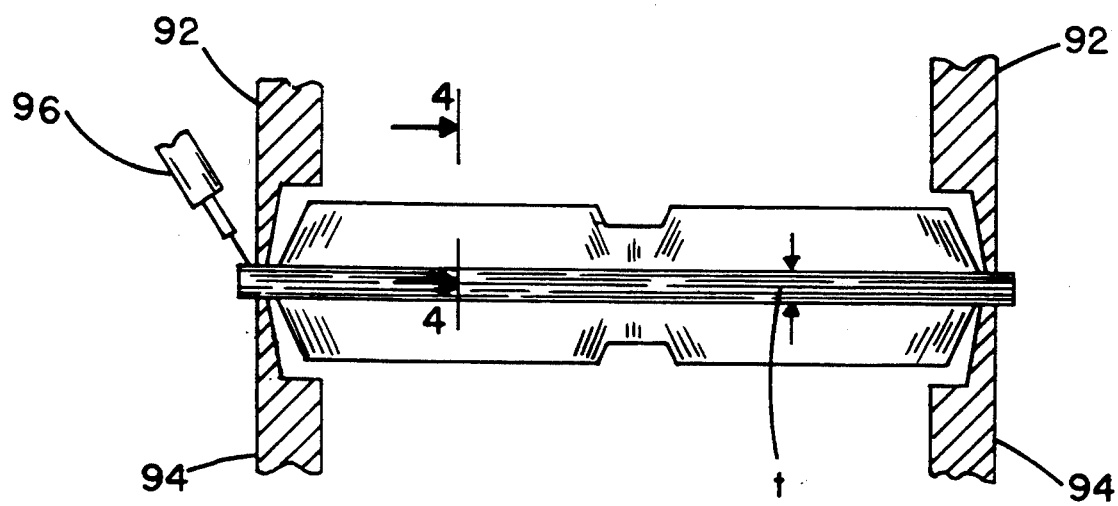
FIG. 3 is a side elevational view of the muffler components clamped together and being welded by a laser welding apparatus.

The components of the muffler 20 are assembled generally as shown in FIG. 3. More particularly, the first and second internal plates 22 and 24 are secured in opposed face-to-face relationship with one another and around portions of the conventional pipe 30. Thus, the conventional pipe 30 will extend from the tube defined by the second flow channels 44 and 64 across the opposed chambers 34 and 54 and through the tube defined by the outlet channels 50 and 70. The internal plates 22 and 24 may be secured in face-to-face relationship by welding, rivets or the like at selected spaced apart locations to prevent vibration related noise therebetween. The assembled internal plates 22 and 24 are then disposed intermediate the respective first and second laminated external shells 26 and 28. Thus, the peripheral flange 76 of the first laminated external shell 26 will be in face-to-face relationship with peripheral regions of the first internal plate 22. Similarly, the peripheral flange 86 of the second laminated external shell 28 will be in face-to-face engagement with peripheral regions of the second internal plate 24. Clamps 92 and 94 are then used to securely urge the peripheral flanges 76 and 86 of the first and second laminated external shells 26 and 28 tightly toward one another. A laser welding apparatus 96 then is employed to make a continuous laser weld entirely about the registered peripheral flanges 76 and 86. The laser welding apparatus 96 is effective to hermetically seal regions of the muffler 20 interiorly of the peripheral flanges 76, 86.

The continuous hermetically sealed seam defined along the peripheral flanges 76, 86 by the laser welding apparatus 96 is significant in several important respects.

First, the laser welding apparatus 96 has proved to be extremely effective in welding simultaneously through the six thicknesses of sheet metal defining peripheral regions of the muffler 20. A high quality continuous hermetically sealed seam is repeatedly obtained so long as the thickness "t" of the peripheral regions remains substantially uniform about the periphery of the muffler 20. This uniform thickness "t" is achieved by the peripheral clamps 92 and 94 shown in FIG. 3. As noted above, prior art spot welded seams could not be used for connecting more then four layers of sheet metal. Additionally, as noted above, the prior art mechanically crimped flanges could not approach the hermetic sealing enabled by the laser welding apparatus 96.

Figure 4:
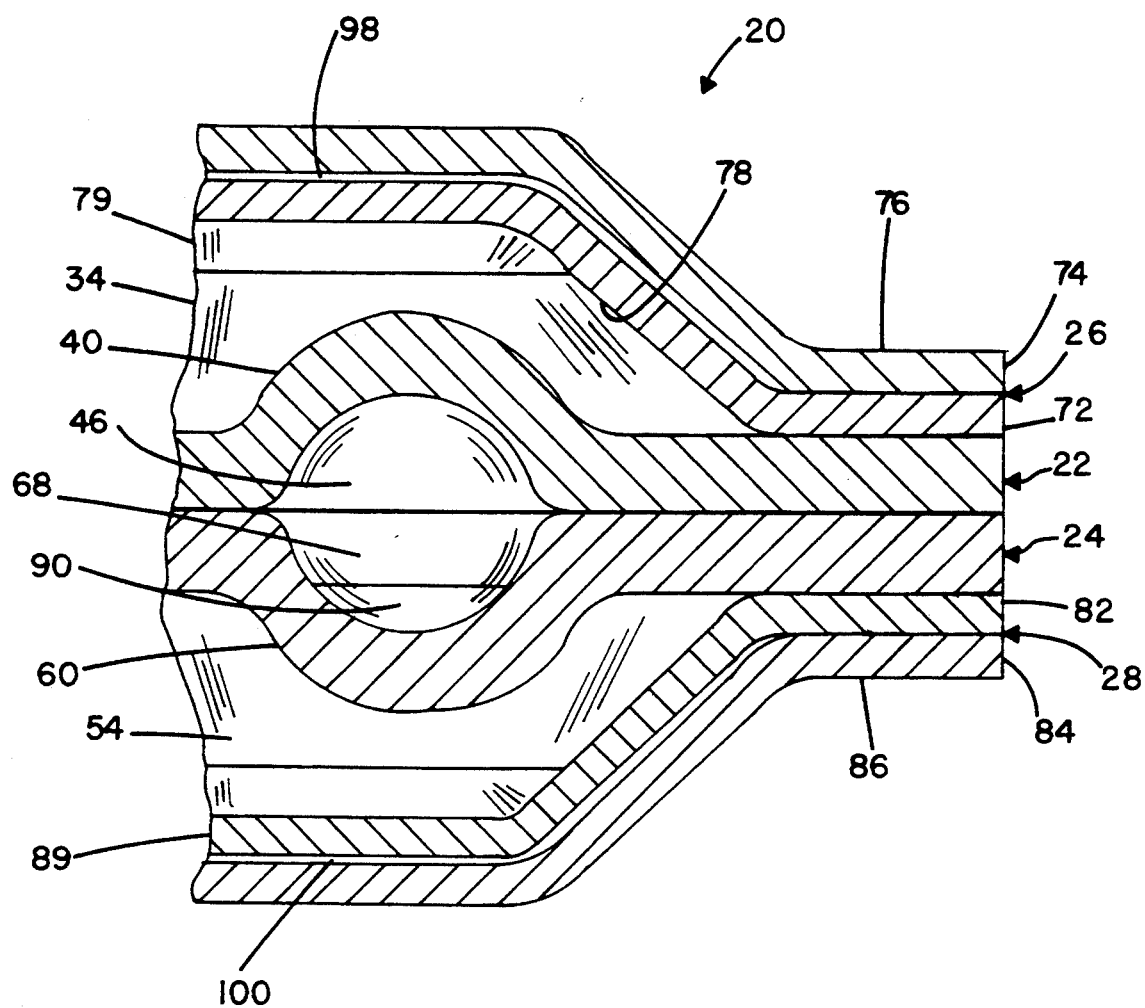
FIG. 4 is a cross-sectional view taken along line 4—4 in FIG. 3.

The hermetic sealing enabled by the laser apparatus is significant in another important respect. In particular, although the inner and outer layers 72, 74 and 82, 84 of the respective laminated external shells 26 and 28 are stamp formed simultaneously, each layer exhibits different spring-back characteristics upon removal from the stamping apparatus. The different spring-back characteristics are attributable to different metallurgical characteristics of the sheets of metal 16 and 18 which form the inner and outer layers 72 and 74 or 82 and 84. In view of the different spring-back characteristics, a minute air gap will be created between the inner and outer layers 72 and 74 or 82 and 84 when the flanges 76 and 86 are urged tightly together. This air gap will be permanently retained and hermetically sealed upon completion of the laser welding. Hence, a hermetically sealed air chamber 98, 100 is defined within the respective laminated external shells 26 and 28, as shown in FIG. 4. The hermetically sealed chambers 98, 100 effectively cushion vibrations that would otherwise be generated by pulsating exhaust gases flowing through the muffler 20. Hence, shell ring can be substantially avoided without complex reinforcing rib patterns. The hermetically sealed chambers 98 and 100 further contribute to both noise and heat insulation generated directly from the flowing exhaust gases.

As noted above, metal employed in mufflers is subject to corrosion due to moisture and corrosive chemicals used on roads or found in the exhaust gases. Corrosion also can be generated by galvanic reactions generated by moisture disposed between closely spaced layers of metal. Galvanic reactions can be greater if the moisture is disposed between dissimilar metals. The hermetic seal defined by the laser apparatus 96 prevents the wicking of moisture into the minute air chamber 98, 100 between the layers 72, 74 or 82, 84 of the respective laminated external shells 26 and 28. Hence, corrosion due to moisture between two closely spaced layers of metal can be avoided. The metal for the respective inner and outer layers 72 and 74 or 82 and 84 can be chosen in view of performance needs and substantially independent of concerns over corrosion generated by galvanic action. Hence, for example, the inner layers 72 and 82 may be formed from a stainless steel exhibiting good long term resistance to the corrosive chemicals found in the exhaust gas. The outer layers, 74 and 84, however, may be formed from a different material in view of less direct exposure to corrosive chemicals. As another example, some mufflers are disposed at locations on a vehicle where they are readily visible, and aesthetic appearance of these mufflers may be important. In these situations, at least one of the outer layers 74 and 84 may be formed from material having the desired appearance (e.g., polished, dull, metallic, etc.).

The use of two layers for the laminated external shells 26 and 28 does not necessarily add to material cost or to the weight of the muffler. For example, the external shell of a typical prior art stamp formed muffler might be formed from sheet metal having a thickness of 0.034 or 0.042 inch. The comparable external shell formed in accordance with the subject invention might have inner and outer layers formed from 0.018 inch thick sheet metal or a 0.021 inch thick sheet metal. Sheet metal at either of these thicknesses is readily commercially available and would yield a combined external shell thickness approximately equal to or slightly greater than the comparable thickness on a prior art muffler. Additionally, the enhanced vibration dampening achieved with the laminated external shells of the subject invention may entirely avoid the use of reinforcing ribs or significantly reduce the number and the depth of any reinforcing ribs that may be required. Consequently, there is less surface area and slightly less metal than had been required in the prior art. Still further, elimination of reinforcing ribs or other reinforcing structures reduces the stretching of metal during the formation of the external shells, and the likelihood of parts failing during manufacturing processees is reduced. The hermetically sealed chambers 98, 100 created by the spring-back and subsequent laser welding do not add significantly to the overall space envelope required for the muffler. In particular, the spring-back and subsequent laser welding of the layers in the laminated external shells 26 and 28 generally will result in a space between the layers equal to approximately 10% of the combined thicknesses. Other gap dimensions between the layers could be achieved by using other clamping apparatus. However, a gap with a height equal to approximately 10% of the total metal thickness in the laminated external shell has been found to be easily achievable and extremely effective in attenuating shell ring.

While the invention has been described with respect to a preferred embodiment, it is apparent that various changes can be made without departing from the scope of the invention as defined by the appended claims. For example, many other arrangement of internal components could be provided, including those incorporating separate baffles to define chambers and those relying to a greater extend or completely upon conventional tubular components. These and other variations will be apparent to a person skilled in the art after having read the subject disclosure.

What is claimed is:

1. A method for manufacturing an exhaust muffler comprising the steps of:

forming first and second laminated external shells from first and second inner layers and first and second outer layers of sheet metal respectively such that each said laminated external shell includes a peripheral flange and at least one chamber extending from said peripheral flange;

providing internal components for channeling exhaust gas through said muffler;

securely clamping the peripheral flanges of said laminated external shells in registration with one another such that said internal components are disposed within the chambers defined by the laminated external shells, said clamping of said peripheral flanges urging the inner and outer layers of each said external shell into slightly spaced relationship from one another to define an air chamber therebetween; and continuously welding said peripheral flanges to hermetically seal said respective inner and outer layers of each said external shell to one another such that said air chamber between the respective inner and outer layers of each said external shell define hermetically sealed air cushions for dampening vibrations of said shell.

2. A method of claim 1, wherein each said external shell has the inner and outer layers thereof simultaneously formed.

3. The method of claim 2, wherein the forming is carried out by stamping sheets of metal.

4. The method of claim 1, wherein the inner layer of at least one external shell is formed from a material different from the outer layer thereof.

5. The method of claim 1, wherein each of said inner and outer layers is formed from a metal having a thickness in the range of 0.015 inch–0.025 inch.

6. The method of claim 5, wherein the external shells are formed, clamped and welded such that the distance between the respective inner and outer layers of each said external shell is approximately equal to one-tenth the combined thickness of the inner and outer layers of the respective external shell.

7. The method of claim 1, wherein the step of providing internal components comprises: providing first and second internal plates; stamping each said internal plate to define an array of channels therein; securing said internal plates in face-to-face relationship such that the channels define tubes between said internal plates and securing said internal plates between the external shells of the muffler.

8. The method of claim 7, wherein the step of continuously welding the peripheral flanges in registration with one another comprises laser welding the peripheral flanges and peripheral regions of said internal plates in registration with one another.

* * * * *